(12) United States Patent  
Eguchi (10) Patent No.: US 12,313,164 B2  
(45) Date of Patent: May 27, 2025

(54) SEALING DEVICE

(71) Applicant: NOK CORPORATION, Tokyo (JP)

(72) Inventor: Nobuyuki Eguchi, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 113 days.

(21) Appl. No.: 17/601,707

(22) PCT Filed: May 13, 2020

(86) PCT No.: PCT/JP2020/019074  
§ 371 (c)(1),  
(2) Date: Oct. 5, 2021

(87) PCT Pub. No.: WO2020/250613  
PCT Pub. Date: Dec. 17, 2020

(65) Prior Publication Data  
US 2022/0205538 A1  Jun. 30, 2022

(30) Foreign Application Priority Data

Jun. 11, 2019 (JP) .................................. 2019-108488

(51) Int. Cl.  
*F16J 15/32* (2016.01)  
*F16J 15/3212* (2016.01)  
*F16J 15/3224* (2016.01)

(52) U.S. Cl.  
CPC ....... *F16J 15/3212* (2013.01); *F16J 15/3224* (2013.01)

(58) Field of Classification Search  
CPC ...... F16J 15/32; F16J 15/3212; F16J 15/3224; F16J 15/3204  
See application file for complete search history.

(56) References Cited

U.S. PATENT DOCUMENTS 2,264,148 A    11/1941   Fisher, Jr. et al.  
2,434,484 A *   1/1948   Chambers, Jr. ...... F16J 15/3212  
                                                     277/553

(Continued)

FOREIGN PATENT DOCUMENTS

CN       104583653 A     4/2015  
CN       204592290 U     8/2015

(Continued)

OTHER PUBLICATIONS

German Office Action dated Jul. 6, 2022 with English translation (corresponding to DE 11 2020 002 791.0).

(Continued)

*Primary Examiner* — Eugene G Byrd  
*Assistant Examiner* — L. Susmitha Koneru  
(74) *Attorney, Agent, or Firm* — Harness, Dickey & Pierce, P.L.C.

(57) ABSTRACT

A sealing device in which damage on a resin seal by a plate spring can be suppressed is provided. The sealing device includes a metal ring 110, a resin seal 120 which is deformed on the radially inward side to be curved toward a sealed-region side and, in this state, slidably in close contact with an outer surface of a shaft 200, and a plate spring 130 which presses a radially inward side of the resin seal 120 radially inward, wherein, a bent portion 133 in which a part of a distal end of the plate spring 130 on the radially inward side is bent in advance so that the distal end of the plate spring 130 on the radially inward side is separated from the outer surface of the resin seal 120 in a state where the shaft 200 is inserted.

8 Claims, 12 Drawing Sheets

(56) References Cited

U.S. PATENT DOCUMENTS

| | | | |
|---|---|---|---|
| 2,466,533 A | | 4/1949 | Chambers, Jr. et al. |
| 2,750,212 A | * | 6/1956 | Skinner ................ F16J 15/3212 |
| | | | 277/577 |
| 4,172,599 A | * | 10/1979 | Forch .................... F16J 15/322 |
| | | | 277/572 |
| 5,114,161 A | * | 5/1992 | Sgourakes ........... F16J 15/3204 |
| | | | 277/500 |
| 2004/0131475 A1 | * | 7/2004 | Yokomachi .......... F16J 15/3268 |
| | | | 417/269 |
| 2005/0067791 A1 | * | 3/2005 | Bock ..................... F16J 15/104 |
| | | | 277/500 |
| 2012/0104701 A1 | * | 5/2012 | Bertini ................. F16J 15/3212 |
| | | | 277/573 |
| 2015/0192205 A1 | | 7/2015 | Oiyama et al. |
| 2015/0226330 A1 | | 8/2015 | Yoshino et al. |
| 2016/0146351 A1 | * | 5/2016 | Janian .................. F16J 15/3228 |
| | | | 277/560 |
| 2017/0175898 A1 | | 6/2017 | Yoshino |

FOREIGN PATENT DOCUMENTS

| | | |
|---|---|---|
| EP | 1164319 A2 | 12/2001 |
| JP | S55-140155 U | 10/1980 |
| JP | H02-036661 U | 3/1990 |
| JP | H02-43564 U | 3/1990 |
| JP | H04-096670 U | 8/1992 |
| JP | H05-083542 U | 11/1993 |
| JP | 2015-203491 A | 11/2015 |
| WO | 2014/030413 A1 | 2/2014 |
| WO | 2014/030742 A1 | 2/2014 |
| WO | 2016/009803 A1 | 1/2016 |

OTHER PUBLICATIONS

Chinese Office Action dated Apr. 7, 2024 (corresponding to CN 2020800225460) with English translation.

* cited by examiner

SEALING DEVICE

CROSS-REFERENCE TO RELATED APPLICATIONS

This application is a National Stage of International Application No. PCT/JP2020/019074, filed May 13, 2020 (now WO 2020/250613A1), which claims priority to Japanese Application No. 2019-108488, filed Jun. 11, 2019. The entire disclosures of each of the above applications are incorporated herein by reference.

FIELD

The present disclosure relates to a sealing device including a resin seal.

BACKGROUND

Figure 11:
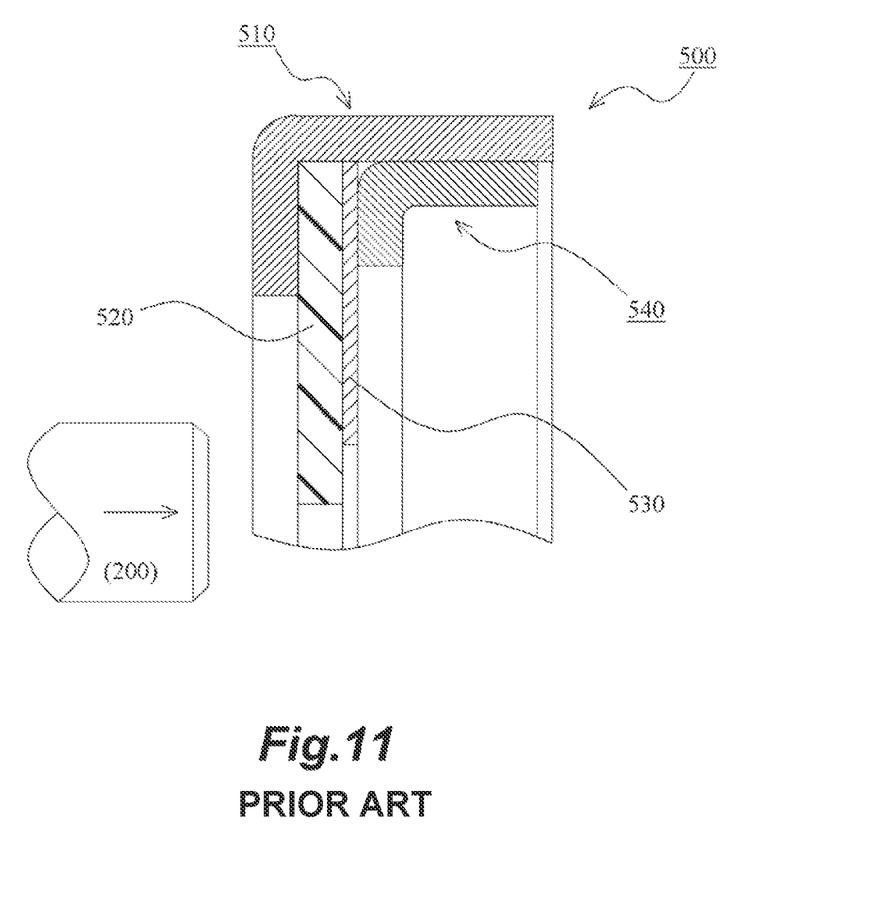
FIG. 11 is a schematic sectional view of a sealing device according to a prior art.

The applicant of the present application proposed an art that can maintain stable sealing performances even if axial eccentricity occurs in a sealing device including a resin seal (see PTL 1). The sealing device according to this prior art will be described with reference to FIG. 11. FIG. 11 is a schematic sectional view of the sealing device according to the prior art.

The sealing device 500 according to the prior art includes a metal ring 510 fitted in an inner surface of a shaft hole provided in a housing (not shown), a resin seal 520 having a plate-shaped and annular resin member, a plate spring 530 having a plate-shaped and annular metal member, and a fixing ring 540 for fixing the resin seal 520 and the plate spring 530 to the metal ring 510. The resin seal 520 is fixed to the metal ring 510 on the radially outward side and the resin seal 520 is deformed, when a shaft 200 is inserted, on the radially inward side to be curved toward a sealed-region side and, in this state, slidably in close contact with an outer surface of the shaft 200. The plate spring 530 is fixed to the metal ring 510 on the radially outward side and, when the shaft 200 is inserted, the plate spring 530 is deformed on the radially inward side to be curved along the resin seal 520 and presses a radially inward side of the resin seal 520 radially inward.

The resin seal 520 of the sealing device 500 configured as above is prevented from separating from the outer surface of the shaft 200 when the axial eccentricity occurs, because the resin seal 520 is pressed by the plate spring 530 radially inward. Thus, stable sealing performance is maintained.

Figure 12:
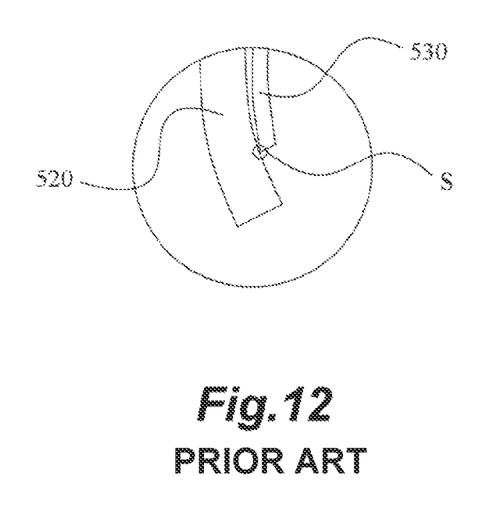
FIG. 12 is a schematic sectional view illustrating a state where the distal end of the plate spring bites into the resin seal.

However, in this sealing device 500, it was found that a distal end of the plate spring 530 might bite into the resin seal 520 in a process of deformation of the resin seal 520 and the plate spring 530 when the shaft 200 is inserted. That is, as illustrated in FIG. 12, a corner part on the resin seal 520 side in the distal end of the plate spring 530 may bite into the resin seal 520 (see a part pointed to by a sign S in the figure). FIG. 12 is a schematic sectional view illustrating a part of the resin seal 520 and the plate spring 530 in the process in which the shaft is inserted.

When such a phenomenon occurs, the sealing device 500 may not fully function. Therefore, there is a room for improvement.

CITATION LIST

Patent Literature

[PTL 1] Japanese Patent Application Publication No. 2015-203491

SUMMARY

Technical Problem

An object of the present disclosure is to provide a sealing device in which damage on the resin seal by the plate spring can be suppressed.

Solution to Problem

The present disclosure employs the following means in order to achieve the aforementioned object.

That is, a sealing device of the present disclosure is, a sealing device for sealing an annular gap between a shaft and a housing configured to move relatively, the sealing device including: a metal ring configured to be fitted to an inner surface of a shaft hole provided in the housing; a resin seal having a plate-shaped and annular resin member, the resin seal being fixed to the metal ring on the radially outward side, and the resin seal being deformed, when the shaft is inserted, on the radially inward side to be curved toward a sealed-region side and, in this state, slidably in close contact with an outer surface of the shaft; and a plate spring having a plate-shaped and annular metal member, the plate spring being fixed to the metal ring on the radially outward side, the plate spring being deformed, when the shaft is inserted, on the radially inward side to be curved along the resin seal, and the plate spring pressing a radially inward side of the resin seal radially inward, wherein a distal end of the plate spring has a biting-suppression structure configured to prevent the distal end of the plate spring from biting into the resin seal.

According to the present disclosure, the distal end of the plate spring on the radially inward side is prevented from biting into the resin seal when the shaft is inserted or the like.

The biting-suppression structure may have a bent portion in which a part of the distal end of the plate spring on the radially inward side is bent in advance so that the distal end of the plate spring on the radially inward side is separated from an outer surface of the resin seal in a state where the shaft is inserted.

This prevents the distal end of the plate spring on the radially inward side from biting into the resin seal when the shaft is inserted or the like because the distal end of the plate spring on the radially inward side is configured to be separated from the outer surface of the resin seal due to the bent portion.

In a state before the shaft is inserted, a bending angle $\theta$ of the bent portion may be 30° or more on the resin seal side.

This prevents the distal end of the plate spring on the radially inward side from biting into the resin seal more reliably.

In the state before the shaft is inserted, a radius of curvature of a bending part in the bent portion may be 0.1 mm or more on the resin seal side.

This prevents the bending part in the bent portion from biting into the resin seal.

In the state before the shaft is inserted, the following may hold:

$0 < X/L < 0.2$, where L is a width in the radial direction of the resin seal and X is a distance in a radial direction between a distal end of the plate spring on the radially inward side and the distal end of the resin seal on the radially inward side.

In the state before the shaft is inserted, the following may hold:

$0.03 < Y/L < 0.3$, where L is a width in the radial direction of the resin seal and Y is a distance in the radial direction from the distal end of the resin seal on the radially inward side to a bending part in the bent portion.

The biting-suppression structure may have a curved portion that is curved so that the distal end of the plate spring is bent back. The biting-suppression structure may be configured by providing the distal end of the plate spring with a protection portion that covers the distal end of the plate spring.

Each of the aforementioned structures may be employed in as many combinations as possible.

Advantageous Effects of the Disclosure

According to the present disclosure, damage on the resin seal by the plate spring can be suppressed.

DESCRIPTION OF EMBODIMENTS

Hereinafter, forms for implementing the present disclosure will be described exemplarily in detail based on embodiments by referring to the drawings. However, dimensions, materials, shapes, relative disposition and the like of components described in the embodiments are not intended to limit the scope of the present disclosure only to them unless otherwise specifically described.

First Embodiment

By referring to FIGS. 1 to 7, a sealing device according to the first embodiment of the present disclosure will be described. Note that the sealing device according to the present embodiment is configured to seal an annular gap between a shaft and a housing configured to move relatively. The relative movement between a shaft and a housing may include relative rotation between a shaft and a housing, relative reciprocation between a shaft and a housing, relative swing between a shaft and a housing, and combination of two or more of these movements.

<Sealing Device>

Figure 1:
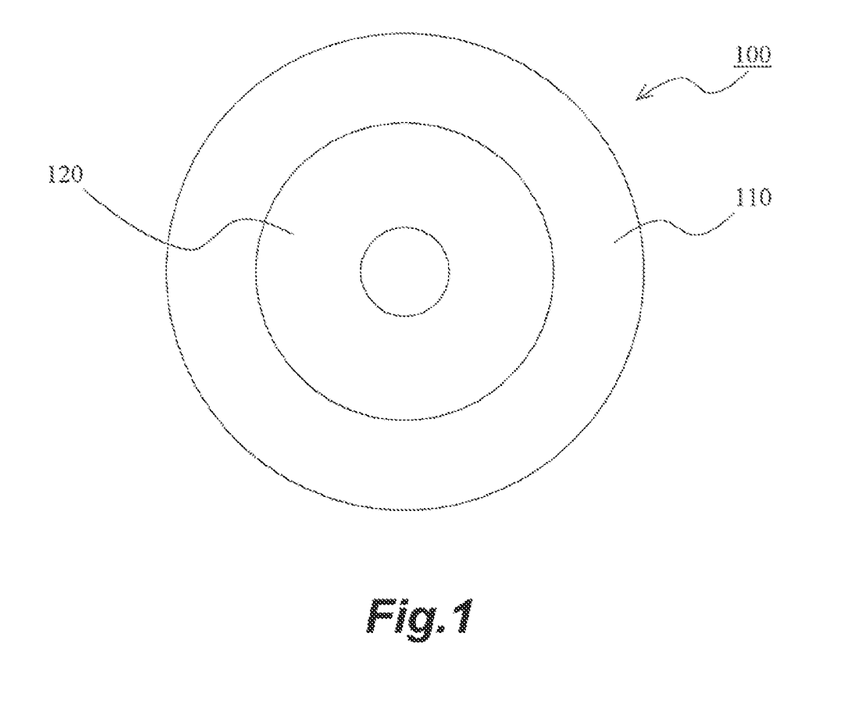
FIG. 1 is a plan view of a sealing device according to the first embodiment of the present disclosure.
Figure 2:
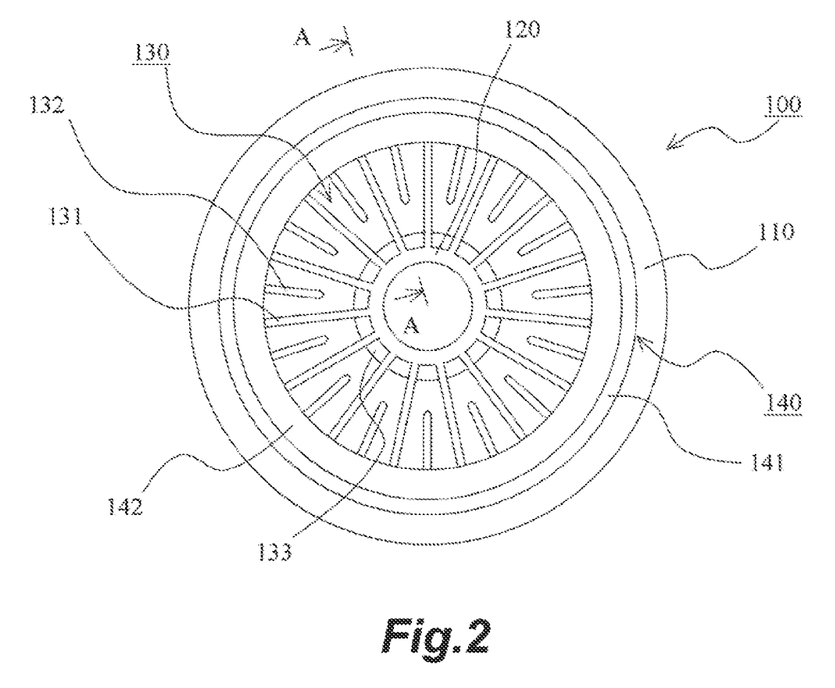
FIG. 2 is a bottom view of the sealing device according to the first embodiment of the present disclosure.
Figure 3:
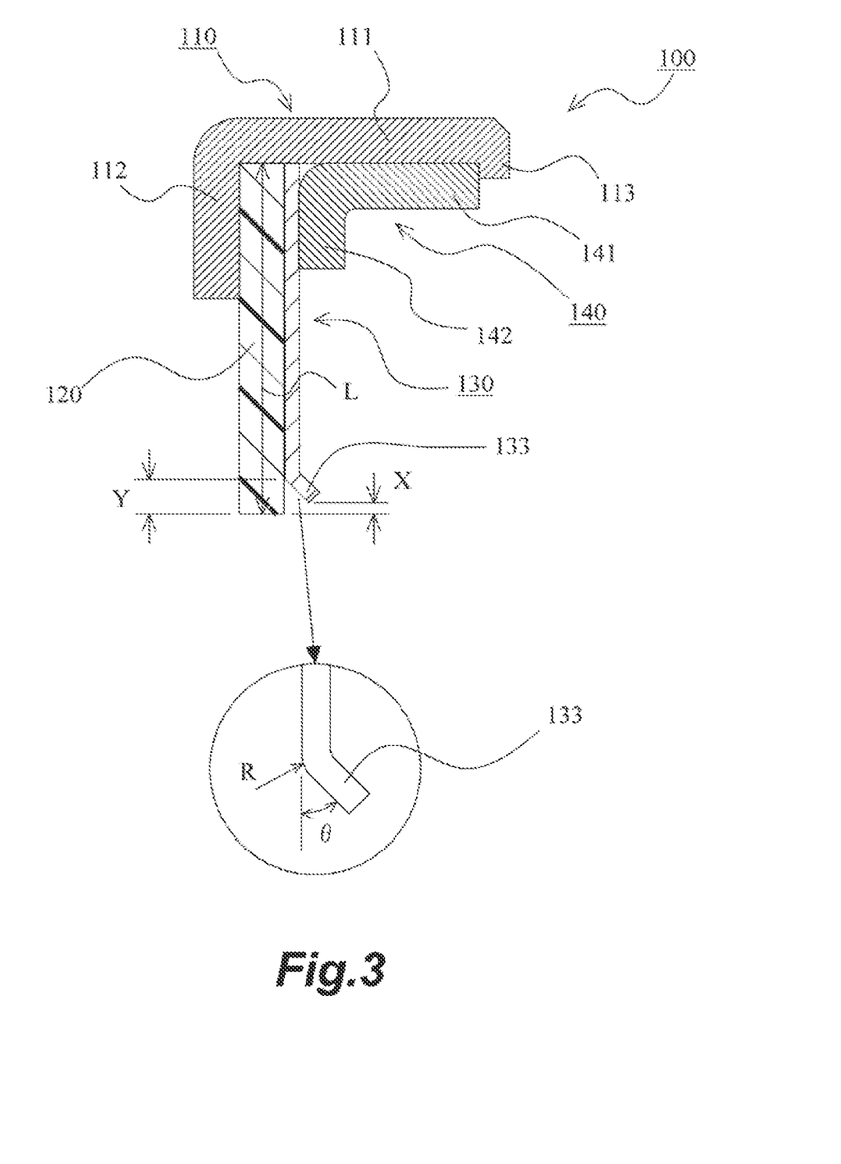
FIG. 3 is a schematic sectional view of the sealing device according to the first embodiment of the present disclosure.
Figure 4:
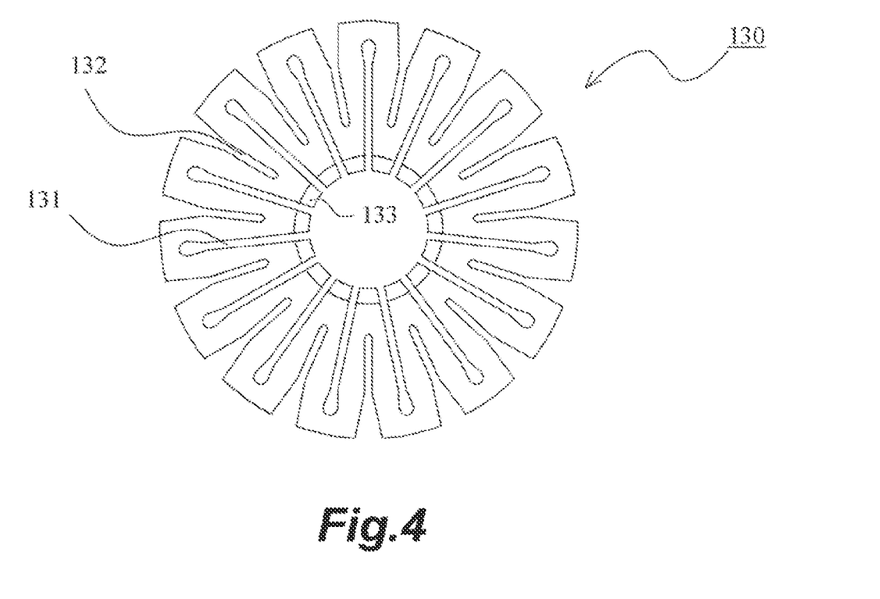
FIG. 4 is a plan view of a plate spring according to the first embodiment of the present disclosure.
Figure 5:
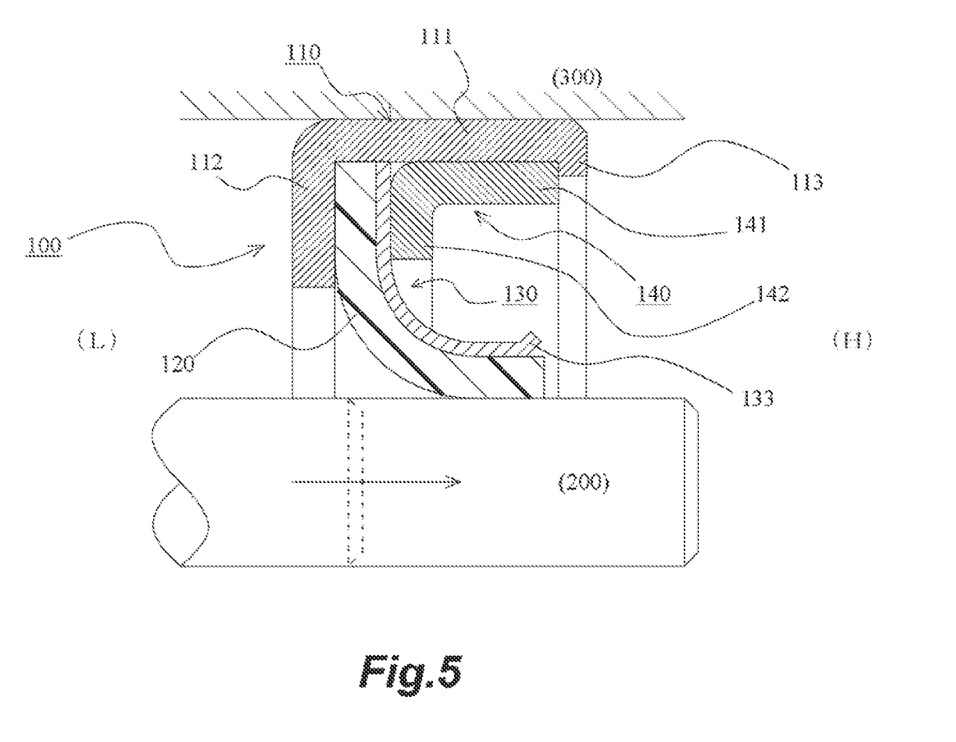
FIG. 5 is a schematic sectional view illustrating the sealing device in use according to the first embodiment of the present disclosure.
Figure 6:
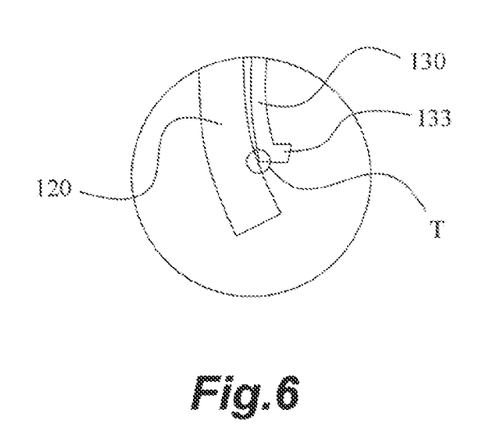
FIG. 6 is a schematic sectional view illustrating a state where a bending part of the plate spring bites into the resin seal.
Figure 7:
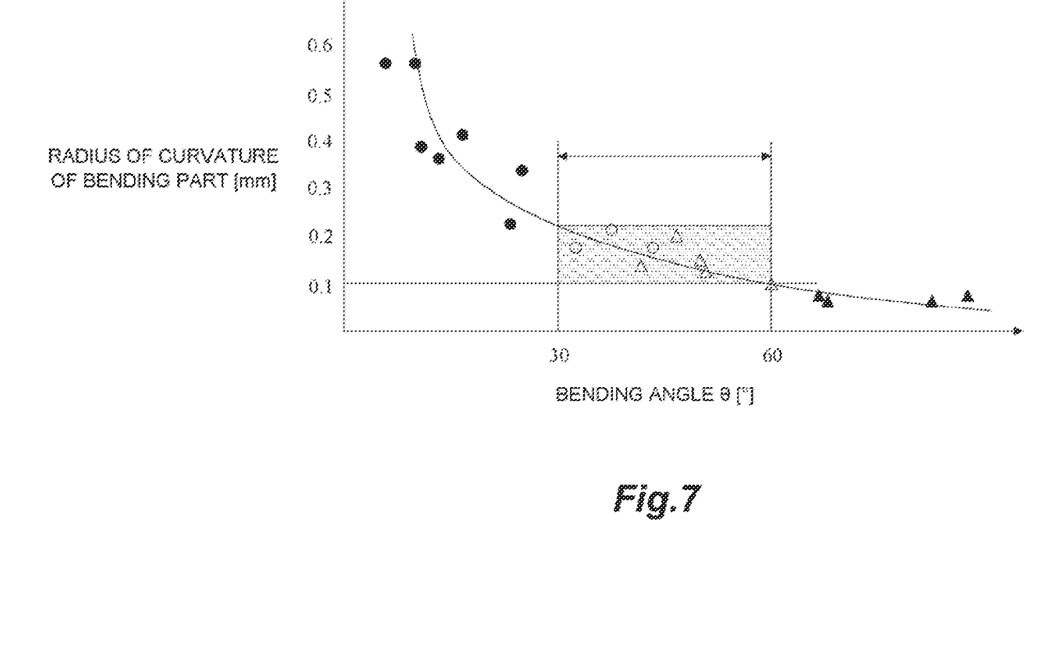
FIG. 7 is a graph illustrating a relationship between a bending angle and a radius of curvature of the bending part.

A configuration of the sealing device 100 according to the present embodiment will be described. FIG. 1 is a plan view of the sealing device according to the first embodiment of the present disclosure. FIG. 2 is a bottom view of the sealing device according to the first embodiment of the present disclosure. FIG. 3 is a schematic sectional view of the sealing device according to the first embodiment of the present disclosure. FIG. 3 is a cross-sectional view indicated by AA in FIG. 2, in which a depth line is omitted, and includes a partially enlarged view. FIG. 4 is a plan view of a plate spring according to the first embodiment of the present disclosure. FIG. 5 is a schematic sectional view of the sealing device in use according to the first embodiment of the present disclosure. FIG. 6 is a schematic sectional view illustrating a state where a bending part of the plate spring bites into the resin seal. FIG. 7 is a graph illustrating a relationship between a bending angle and a radius of curvature of the bending part.

The sealing device 100 according to the present embodiment has a metal ring 110, a resin seal 120, a plate spring 130, and a fixing ring 140 made of metal and fixed to an inner surface side of the metal ring 110. The metal ring 110 includes a cylindrical portion 111 configured to be fitted on an inner surface of a shaft hole provided in a housing 300 in a close contact state. The metal ring 110 has an inward flange portion 112 on one end side of the cylindrical portion 111, which extends radially inward, and a swaged portion 113 on the other end of the cylindrical portion 111, which is formed by being bent radially inward. When the sealing device 100 is in use, the aforementioned "the other end side" corresponds to a sealed-region side (high-pressure side (H)), while the aforementioned "one end side" corresponds to an opposite side (low-pressure side (L)) of the sealed-region side.

The resin seal 120 has a plate-shaped and annular resin member. PTFE (polytetrafluoroethylene) is used as a resin material in the present embodiment. The PTFE is excellent in heat resistance, pressure resistance, and chemical resistance and less wearing in sliding. The resin seal 120 is fixed to the metal ring 110 on the radially outward side and the resin seal 120 is deformed on the radially inward side to be curved toward the sealed-region side (high-pressure side (H)) and, in this state, slidably in close contact with the outer surface of the shaft 200.

The plate spring 130 has a plate-shaped and annular metal (SUS, for example) member. The plate spring 130 is fixed to the metal ring 110 on the radially outward side and the plate spring 130 is deformed on the radially inward side to be curved along the resin seal 120 and presses a vicinity of an end portion on a radially inward side of the resin seal 120 radially inward. The plate spring 130 is provided with a plurality of radially inward side slits 131 extending from the radially inward end toward the radially outward end side with intervals in the circumferential direction. The plurality of radially inward side slits 131 are provided at equal intervals in the circumferential direction. The plate spring 130 is provided with a plurality of radially outward side slits 132 extending from the radially outward end toward the radially inward end side with intervals in the circumferential direction. The plurality of radially outward side slits 132 are provided at equal intervals in the circumferential direction. The radially inward side slits 131 and the radially outward side slits 132 are provided alternately in the circumferential direction. The plate spring 130 is provided with a bent portion 133 in which a part of a distal end portion on the radially inward side of the plate spring 130 is bent in advance.

The fixing ring 140 has a cylindrical portion 141 fixed to the inner surface side of the metal ring 110 and an inward flange portion 142 on one end side of the cylindrical portion 141, which extends radially inward. In a state where the fixing ring 140 is disposed on the inner surface side of the metal ring 110, the swaged portion 113 is formed by bending radially inward an end portion on the other end side (sealed-region side) of the metal ring 110 to abut against the end portion of the fixing ring 140. As a result, the end portion on the radially outward side of the resin seal 120 and the end portion on the radially outward side of the plate spring 130 are compressed between the inward flange portion 112 and the fixing ring 140, whereby the radially outward side of the resin seal 120 and the radially outward side of the plate spring 130 are fixed to the metal ring 110.

<Attaching Method of Sealing Device and Use State>

Particularly by referring to FIG. 5, an attaching method and a use state of the sealing device 100 according to the present embodiment will be described. First, the attaching method of the sealing device 100 will be described. The sealing device 100 configured as above is inserted into the shaft hole provided in the housing 300 and is fitted in the shaft hole. At this time, the outer surface of the cylindrical portion 111 of the metal ring 110 in the sealing device 100 is brought into a state of close contact with the inner surface of the shaft hole. Then, the shaft 200 is inserted from the left side in FIG. 5 (the side to be the opposite side (low-pressure side (L)) of the sealed-region in use) to the right side (the side to be the sealed-region side in use (high-pressure side (H))). As a result, the end portions of the resin seal 120 and the plate spring 130 on the radially inward side are pressed to the shaft 200. Thus, the resin seal 120 and the plate spring 130 are deformed on the radially inward side with respect to positions compressed between the inward flange portion 112 and the fixing ring 140 to be curved toward the sealed-region side (high-pressure side (H)). That is, the resin seal 120 is in slidably close contact with the outer surface of the shaft 200 in a state where the resin seal 120 is deformed on the radially inward side to be curved toward the sealed-region side when the shaft 200 is inserted. The plate spring 130 is deformed on the radially inward side to be curved along the resin seal 120 and presses the radially inward side of the resin seal 120 radially inward when the shaft 200 is inserted.

As described above, in a state where the shaft 200 is inserted, the inner surface near the distal end in a curved portion of the resin seal 120 is brought into close contact with the outer surface of the shaft 200. The inner surface near the distal end in the curved portion of the plate spring 130 is brought into close contact with the outer surface near the distal end in the curved potion in the resin seal 120. Thus, the vicinity of the distal end in the curved portion of the resin seal 120 is pressed by the portion near the distal end of the plate spring 130 radially inward due to an elastic force of the plate spring 130.

<Bent Portion>

The bent portion 133 provided on the radially inward side of the plate spring 130 will be described in detail. The plate spring 130 according to the present embodiment includes the aforementioned bent portion 133 so that the distal end on the radially inward side of the plate spring 130 is separated from the outer surface of the resin seal 120 in the state where the shaft 200 is inserted. The biting-suppression structure to prevent the distal end of the plate spring 130 from biting into the resin seal 120 is configured using the bent portion 133 in the present embodiment. By referring to FIG. 3, dimensional setting of the bent portion 133 will be described.

In the state before the shaft 200 is inserted, the bending angle θ on the resin seal 120 side in the bent portion 133 is set to 30° or more.

(2) In the state before the shaft 200 is inserted, a radius of curvature R of the bending part of the bent portion 133 is set to 0.1 mm or more on the resin seal 120 side.

(3) In the state before the shaft 200 is inserted, 0<X/L<0.2 holds, where L is a width in the radial direction of the resin seal 120 and X is a distance in the radial direction between the distal end of the plate spring 130 on the radially inward side and the distal end of the resin seal 120 on the radially inward side.

(4) In the state before the shaft 200 is inserted, 0.03<Y/L<0.3 holds, where Y is a radial distance from the distal end of the resin seal 120 on the radially inward side to the bending part of the bent portion 133. Note that, as the "distance in the radial direction", only a length along the radial direction is considered and an axial distance due to a difference in axial positions is not considered.

The reasons of the settings as in (1) to (4) will be described by referring to FIGS. 6 and 7. FIG. 7 shows measured values of the angle θ and the radius of curvature R of the bent portion 133 provided on the distal end of the plate spring 130 on the radially inward side manufactured with various bending angles θ of the bent portion 133. The graph shows an approximated curve calculated based on a plurality of measured values.

White circles in FIG. 7 indicate values measured for the plate springs 130 of which the distal ends on the radially inward side do not bite into the outer surface of the resin seal 120. Black circles in FIG. 7 indicate values measured for the plate springs 130 of which the distal ends on the radially inward side have bitten into the outer surface of the resin seal 120. It was found that, even if the bent portion 133 is provided, when the bending angle θ of the bent portion 133 is small, the distal end on the radially inward side of the plate spring 130 bites into the outer surface of the resin seal 120. It was also found from the graph that, by setting the bending angle θ of the bent portion 133 to 30° or more, the distal end of the plate spring 130 on the radially inward side could be prevented from biting into the outer surface of the resin seal 120. This is the reason of the setting (1).

White triangles in FIG. 7 indicate values measured for the plate springs 130 of which the bending parts in the bent portions 133 do not bite into the outer surface of the resin seal 120. Black triangles in FIG. 7 indicate values measured for the plate springs 130 of which the bending parts in the bent portions 133 have bitten into the outer surface of the resin seal 120. It was found that, although the bent portion 133 prevents the distal end of the plate spring 130 on the radially inward side from biting into the outer surface of the resin seal 120, the bending part bites into the outer surface of the resin seal 120 if the radius of curvature of the bending part is small. FIG. 6 illustrates a state where the bending part of the plate spring 130 bites into the resin seal 120 (see a part indicated by a sign T in the figure). It was also found from the graph that, by setting the radius of curvature R to 0.1 mm or more, the bending part could be prevented from biting into the outer surface of the resin seal 120. This is the reason of the setting (2). Setting the bending angle θ to 60° or less allows the radius of curvature R to be set to 0.1 mm or more in the present embodiment. Therefore, setting the bending angle θ to 30°<θ<60°, the distal end on the radially inward side of the plate spring 130 can be prevented from biting into the outer surface of the resin seal 120, and the bending part can be prevented from biting into the outer surface of the resin seal 120.

The setting (3) is set in order to prevent direct contact of the distal end of the plate spring 130 on the radially inward side with the shaft 200 and to allow the plate spring 130 to function stably to press the resin seal 120. The setting (4) is set in order to make sure that the distal end of the plate spring 130 on the radially inward side is separated from the outer surface of the resin seal 120 and to allow the plate spring 130 to function stably to press the resin seal 120.

Advantages of the Sealing Device According to the Present Embodiment

According to the sealing device 100 of the present embodiment, the distal end of the plate spring 130 on the radially inward side is configured to be separated from the outer surface of the resin seal 120 due to the bent portion 133 provided in the plate spring 130. This prevents the distal end of the plate spring 130 on the radially inward side from biting into the resin seal 120 when the shaft 200 is inserted or the like. Therefore, damage on the resin seal 120 by the plate spring 130 can be suppressed. Setting the dimension of each portion as described above can prevent the damage on the resin seal 120 more reliably.

The sealing device 100 according to the present embodiment has the metal ring 110 with the cylindrical portion 111 fitted in close contact with the inner surface of the shaft hole provided in the housing 300. This provides sufficient sealing performances between the outer surface of the metal ring 110 and the inner surface of the shaft hole of the housing 300 even if the housing 300 is configured by casting (casting made of aluminum, for example). That is, the sealing performances can be exerted even if a plurality of fine recesses such as blowholes are present on the inner surface of the shaft hole of the housing 300.

The sealing device 100 according to the present embodiment has the resin seal 120 having a plate-shaped and annular resin member, the resin seal 120 being fixed to the metal ring 110 on the radially outward side, and the resin seal 120 being deformed on the radially inward side to be curved toward the sealed-region side and, in this state, slidably in close contact with the outer surface of the shaft 200. This achieves more excellent heat resistance and the like and reduces slide abrasion as compared with a seal made of a rubber-like elastic body.

The sealing device 100 according to the present embodiment has the plate spring 130 that presses the radially inward side of the resin seal 120 radially inward. This makes it possible to maintain stable sealing performances for a long time even if the resin seal 120 itself is worn by a long-term use under a high-temperature environment.

Second Embodiment

Figure 8:
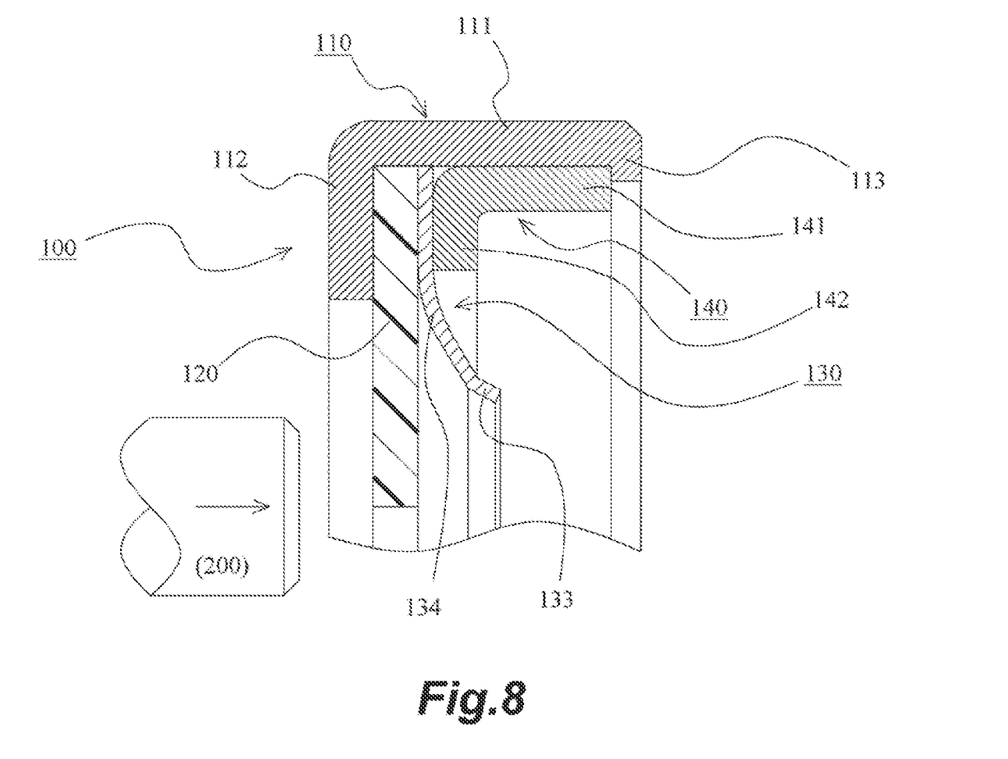
FIG. 8 is a schematic sectional view of the sealing device according to the second embodiment of the present disclosure.

FIG. 8 illustrates the second embodiment of the present disclosure. In the present embodiment, a configuration will be described in which the plate spring is bent by bending process on the radially outward side with respect to the bent portion to be curved toward the sealed-region side. Since the rest of the configuration and effects are the same as those in the first embodiment, the same reference numerals are given to the same constitutional parts, and the explanation will be omitted.

The sealing device 100 according to the present embodiment has the metal ring 110, the resin seal 120, the plate spring 130, and the fixing ring 140 made of metal and fixed to the inner surface of the metal ring 110 similarly to the aforementioned first embodiment. Since the structures of the metal ring 110, the resin seal 120, and the fixing ring 140 are the same as those in the first embodiment, the explanation will be omitted.

The plate spring 130 includes the bent portion 133 in which a part of the distal end portion of the plate spring 130 on the radially inward side is bent in advance. Among the dimensional settings described in the first embodiment, the settings (1) and (2) are employed as in the first embodiment.

The plate spring 130 of the present embodiment is bent by bending process in advance on the radially outward side with respect to the bent portion 133 to be curved toward the side to be the sealed-region side (right side in the figure) when the sealing device 100 is in use (see a curved portion 134 in FIG. 8). This is an only difference from the first embodiment. As described in the first embodiment, the plate spring 130 is deformed, when the shaft 200 is inserted in the sealing device 100, on the radially inward side to be curved toward the sealed-region side (high-pressure side (H)).

In order to keep the pressing force by the plate spring 130 stable for a long time, a deformation amount of the plate spring 130 when the shaft 200 is inserted may fall within the range of elastic deformation. That is, it is preferable to configure such that plastic deformation does not occur. The deformation amount of the plate spring 130 when the shaft 200 is inserted is relatively large in the first embodiment, and thus the deformation amount may not fall within the range of elastic deformation. In the present embodiment, the plate spring 130 is subject to plastic deformation to some degree in advance on the radially inward side through the bending process. This reduces the deformation amount of the plate spring 130 when the shaft 200 is inserted, and thus the deformation amount when the shaft 200 is inserted may fall within the range of elastic deformation.

In the sealing device 100 configured as above, the effects similar to those in the first embodiment can be obtained. Note that bending the plate spring 130 on the radially inward side and the resin seal 120 on the radially inward side in advance may allow the shaft 200 to be inserted from the side to be the sealed-region side (high-pressure side (H)) in use into the side opposite to the sealed region (low-pressure side (L)). In this case, an inner diameter of a radially inward side end of the resin seal 120 that has undergone the bending process (the smallest inner diameter) may be set larger than an outer diameter of the distal end of the shaft 200.

Third Embodiment

Figure 9:
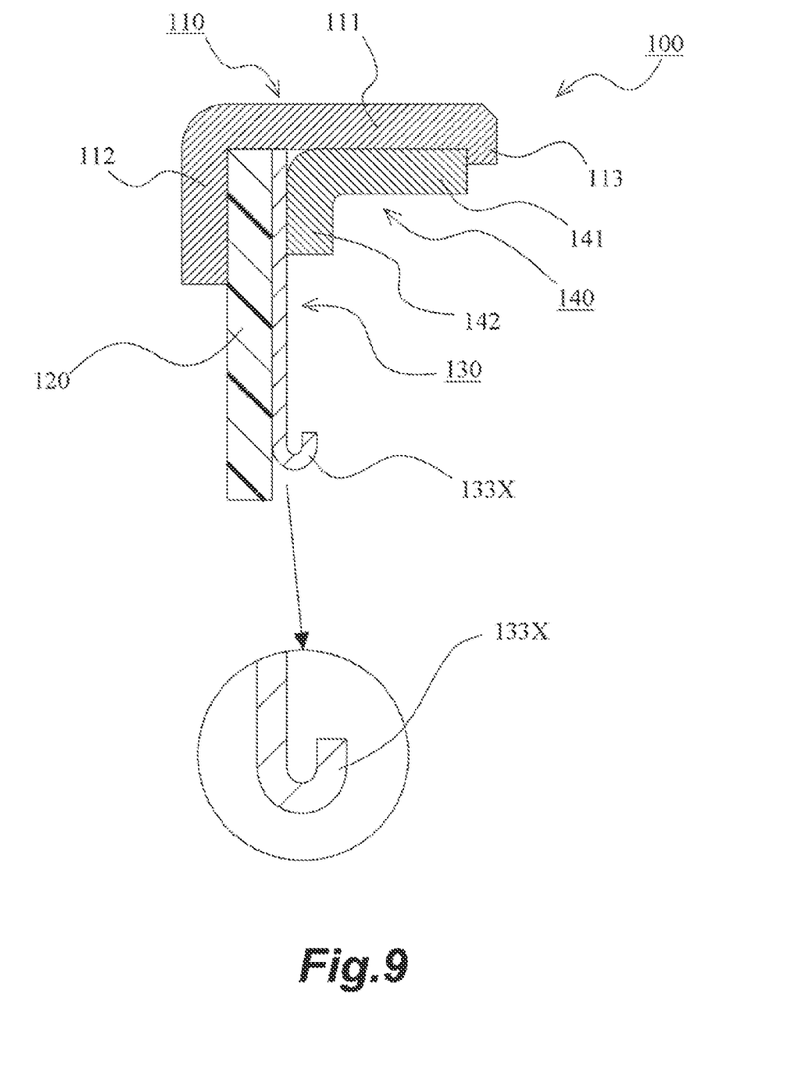
FIG. 9 is a schematic sectional view of the sealing device according to the third embodiment of the present disclosure.

FIG. 9 illustrates the third embodiment of the present disclosure. The biting-suppression structure in the distal end of the plate spring of the present embodiment, which is different from the first embodiment, will be described. Since the other structures and effects are the same as those in the first embodiment, the same reference numerals are given to the same constitutional parts, and explanation will be omitted.

FIG. 9 is a schematic sectional view of the sealing device according to the third embodiment of the present disclosure. FIG. 9 is a cross-sectional view, which corresponds to the cross-sectional view in the first embodiment indicated by AA in FIG. 2, in which a depth line is omitted, and includes a partially enlarged view. The sealing device 100 according to the present embodiment has the metal ring 110, the resin seal 120, the plate spring 130, the fixing ring 140 made of metal and fixed to the inner surface of the metal ring 110 similarly to the first embodiment. Since the structures of the metal ring 110, the resin seal 120, and the fixing ring 140 are the same as those in the first embodiment, the explanation will be omitted.

In the present embodiment, the plate spring 130 includes a curved portion 133X in which a part of the distal end portion of the plate spring 130 is bent in advance on the radially inward side. The curved portion 133X is configured such that the distal end of the plate spring 130 is curved to be bent back. The present embodiment is different from the first embodiment only in this point. That is, the biting-suppression structure of the present embodiment is configured using the curved portion 133X. In the present embodiment, the plate spring 130 is deformed, when the shaft 200 is inserted into the sealing device 100, on the radially inward side to be curved toward the sealed-region side (high-pressure side (H)), which is similar to the aforementioned first embodiment.

In the sealing device 100 configured as above, since the distal end of the plate spring 130 is bent back by the curved portion 133X, the distal end of the plate spring 130 does not bite into the resin seal 120. Moreover, the curved portion 133X itself does not bite into the resin seal 120, either. Note that, in the present embodiment, the plate spring may be bent by bending process in advance on the radially outward side with respect to the curved portion 133X to be curved toward the side to be the sealed-region side (right side in the figure) when the sealing device 100 is in use as described in the second embodiment.

Fourth Embodiment

Figure 10:
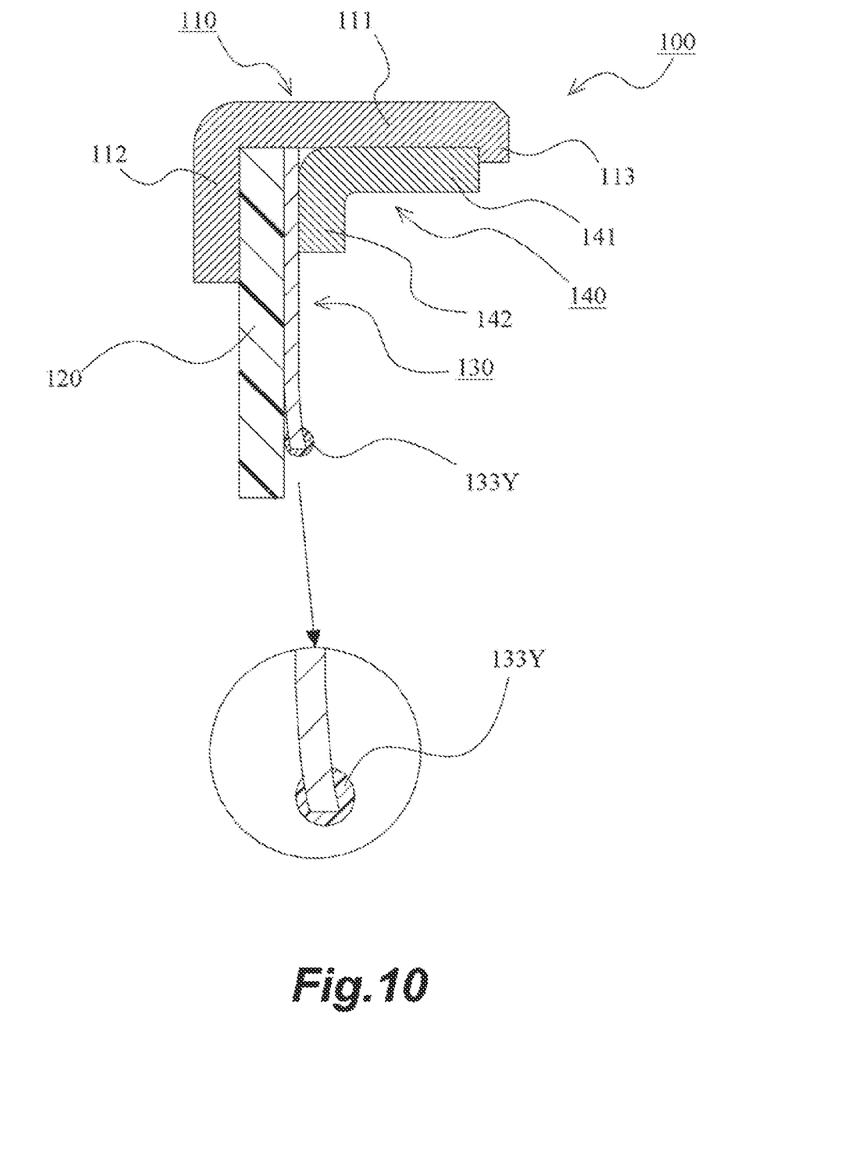
FIG. 10 is a schematic sectional view of the sealing device according to the fourth embodiment of the present disclosure.

FIG. 10 illustrates the fourth embodiment of the present disclosure. The biting-suppression structure in the distal end of the plate spring of the present embodiment, which is different from the first embodiment, will be described. Since the other structures and effects are the same as those in the first embodiment, the same reference numerals are given to the same constitutional parts, and the explanation will be omitted.

FIG. 10 is a schematic sectional view of the sealing device according to the fourth embodiment of the present disclosure. FIG. 10 is a cross-sectional view, which corresponds to the cross-sectional view in the first embodiment indicated by AA in FIG. 2, in which a depth line is omitted, and includes a partially enlarged view. The sealing device 100 according to the present embodiment has the metal ring 110, the resin seal 120, the plate spring 130, the fixing ring 140 made of metal and fixed to the inner surface of the metal ring 110 similarly to the first embodiment. Since the structures of the metal ring 110, the resin seal 120, and the fixing ring 140 are the same as those in the first embodiment, the explanation will be omitted.

The biting-suppression structure of the present embodiment is configured by providing the distal end of the plate spring 130 with a protection portion 133Y which covers the distal end of the plate spring 130. The present embodiment is different from the first embodiment only in this point. The protection portion 133Y can be configured by bonding a resin material or the like to the distal end of the plate spring 130, for example. In the present embodiment, the plate spring 130 is deformed, when the shaft 200 is inserted into the sealing device 100, on the radially inward side to be curved toward the sealed-region side (high-pressure side (H)), which is similar to the aforementioned first embodiment.

In the sealing device 100 configured as above, the distal end of the plate spring 130 does not bite into the resin seal 120 because the distal end of the plate spring 130 is covered by the protection portion 133Y. In addition, the protection portion 133Y does not bite into the resin seal 120, either by appropriately setting the shape or material of the protection portion 133Y. Note that, in the present embodiment, the plate spring may be bent by bending process in advance on the radially outward side with respect to the protection portion 133Y to be curved toward the side to be the sealed-region side (right side in the figure) when the sealing device 100 is in use as described in the second embodiment.

REFERENCE SIGNS LIST

100 Sealing device
110 Metal ring
111 Cylindrical portion
112 Inward flange portion
113 Swaged portion
120 Resin seal
130 Plate spring
131 Radially-inward side slit
132 Radially-outward side slit
133 Bent portion
133X Curved portion
133Y Protection portion
134 Curved portion
140 Fixing ring
141 Cylindrical portion
142 Inward flange portion
200 Shaft
300 Housing

The invention claimed is:
1. A sealing device for sealing an annular gap between a shaft and a housing configured to move relatively, the sealing device comprising:
a metal ring configured to be fitted to an inner surface of a shaft hole provided in the housing;
a resin seal having a plate-shaped and annular resin member that is flat in an undeformed state, the resin seal being fixed to the metal ring on the radially outward side, and the resin seal being deformed, when the shaft is inserted, on the radially inward side to be curved toward a sealed-region side and, in this state, slidably in close contact with an outer surface of the shaft, wherein in an undeformed state the resin seal has a first width in a radial direction; and
a plate spring having a plate-shaped annular metal member having a plurality of radially inward side slits and a plurality of radially outward side slits, the plurality of inward side slits separating the plate spring into a plurality of spring members that are free from a garter spring, the plate spring being fixed to the metal ring on the radially outward side, the plate spring being deformed, when the shaft is inserted, on the radially inward side to be curved along the resin seal, and the plurality of spring members pressing a radially inward side of the resin seal radially inward, wherein in an undeformed state the plate spring has a second width in a radial direction that is smaller than the first width, wherein a distal end of the plurality of spring members has a biting-suppression structure including an outward incline that extends away from the curved resin seal so as to be configured to prevent the distal end of the plurality of spring members from biting into the resin seal, wherein in an installed state on the shaft an axial length of the plurality of spring members are shorter than an axial length of the resin seal.

2. The sealing device according to claim 1, wherein the biting-suppression structure has a bent portion in which a part of the distal end of the plurality of spring members on the radially inward side is bent in advance so that the distal end of the plurality of spring members on the radially inward side is separated from an outer surface of the resin seal in a state where the shaft is inserted.

3. The sealing device according to claim 2, wherein a bending angle θ of the bent portion is 30° or more on the resin seal side in a state before the shaft is inserted.

4. The sealing device according to claim 2, wherein a radius of curvature R of a bending part in the bent portion is 0.1 mm or more on the resin seal side in a state before the shaft is inserted.

5. The sealing device according to claim 2, wherein the following holds in a state before the shaft is inserted:

$0<X/L<0.2$, where L is the first width in the radial direction of the resin seal and X is a distance in a radial direction between a distal end of the plurality of spring members on the radially inward side and the distal end of the resin seal on the radially inward side.

6. The sealing device according to claim 2, wherein the following holds in a state before the shaft is inserted:

$0.03<Y/L<0.3$, where L is the first width in the radial direction of the resin seal and Y is a distance in the radial direction from the distal end of the resin seal on the radially inward side to a bending part in the bent portion.

7. The sealing device according to claim 1, wherein the biting-suppression structure has a curved portion that is curved so that a distal end of the plurality of spring members is bent back.

8. The sealing device according to claim 1, wherein the biting-suppression structure is configured by providing the distal end of the plurality of spring members with a protection portion that covers the distal end of the plurality of spring members.

* * * * *